United States Patent [19]
von Tlück

[11] 4,242,590
[45] Dec. 30, 1980

[54] LIQUID LEVEL DETECTOR WITH HYSTERESIS MEANS

[75] Inventor: Wolfgang von Tlück, Olching, Fed. Rep. of Germany

[73] Assignee: Siemens Aktiengesellschaft, Berlin & Munich, Fed. Rep. of Germany

[21] Appl. No.: 851,938

[22] Filed: Nov. 16, 1977

[30] Foreign Application Priority Data

Apr. 18, 1977 [DE] Fed. Rep. of Germany ....... 2717089

[51] Int. Cl.³ .............................................. G01F 23/00
[52] U.S. Cl. ............................ 250/577; 250/214 RC
[58] Field of Search .............. 250/577, 214 R, 214 A, 250/214 RC, 214 C; 73/293

[56] References Cited

U.S. PATENT DOCUMENTS

| 3,485,262 | 12/1969 | Perren | 250/577 X |
| 3,683,196 | 8/1972 | Obenhaus | 250/577 X |
| 3,835,313 | 9/1974 | Stiefelmeyer et al. | 250/214 C |
| 3,995,169 | 11/1976 | Oddon | 250/577 |
| 4,134,022 | 1/1979 | Jacobsen | 250/577 |

Primary Examiner—David C. Nelms
Assistant Examiner—Darwin R. Hostetter
Attorney, Agent, or Firm—Hill, Van Santen, Steadman, Chiara & Simpson

[57] ABSTRACT

An indicating device is disclosed for showing the level of a fluid in a container. A transparent rod having a sensing end is immersed in the fluid when the container is filled above a predetermined level. The sensing end is shaped to cause a substantially total reflection of a beam of light projected in the rod from an opposite end of the rod when the sensing end is not in contact with the flowable substance. A light source and photoelectric detector are arranged at the opposite end of the rod and a circuit is connected to the photoelectric detector for detecting when a predetermined amount of reflection occurs and also for preventing response of the device to slopping of the fluid to and fro in the container.

6 Claims, 4 Drawing Figures

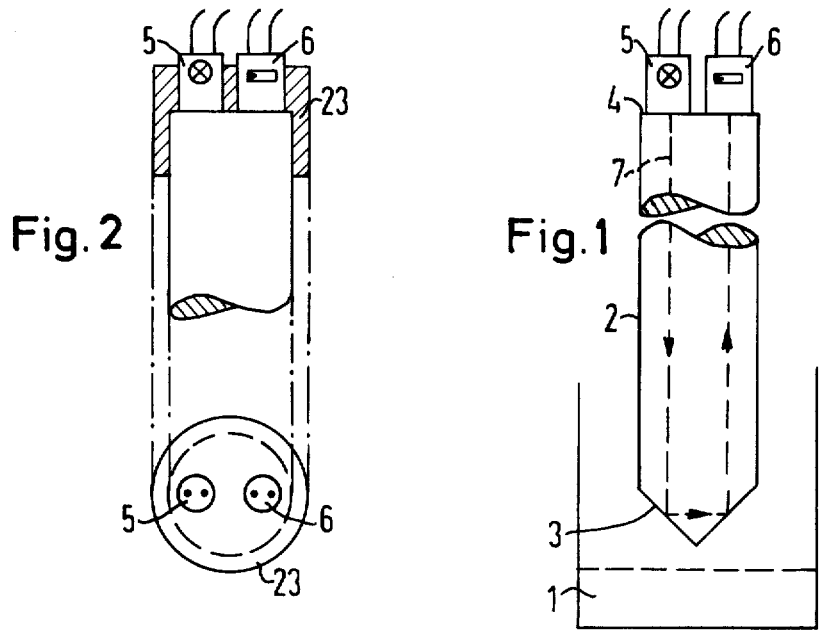
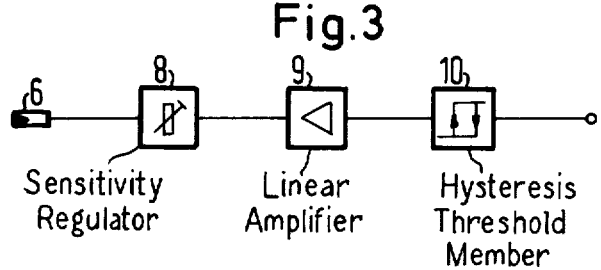
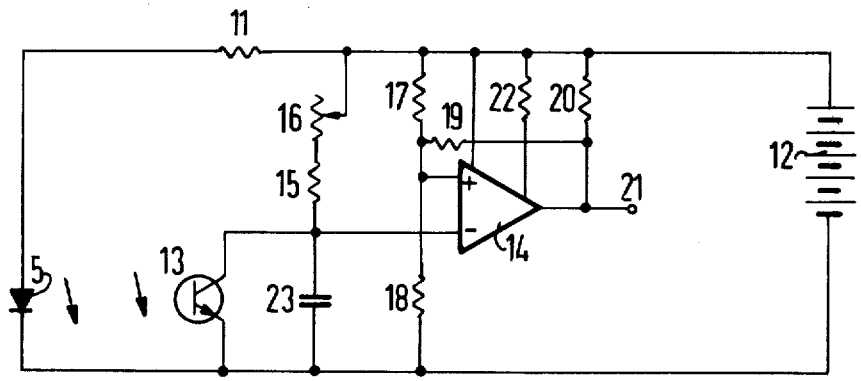

LIQUID LEVEL DETECTOR WITH HYSTERESIS MEANS

BACKGROUND OF THE INVENTION

1. Field of the Invention

The invention relates to an indicating device for showing the level of fluids in fluid containers using a transparent rod which is immersed in the fluid when the container is filled and the sensing end of which extending into the fluid is so formed that a beam of light running in the transparent rod undergoes total reflection at the sensing end when the sensing end is not in contact with fluid.

2. Description of the Prior Art

For the purposes of measuring the acid level in accumulators it is known for indicating devices to be screwed into position in place of the sealing plugs for the individual accumulator cells. These indicating devices consist of glass rods that are tapered conically at their end and are of a length corresponding to the minimum acid level in the accumulator. An indicating device of this kind works in the following way. When the acid level in the accumulator has dropped below the minimum level determined by the length of the rod and the cone on the rod is consequently no longer immersed, the light entering from outside undergoes total reflection at the conical end of the glass rod and the plane end of the glass rod appears as a bright spot. But when the accumulator is filled, the incident light is not reflected and the plane end of the glass rod appears dark.

Measurement of the level in a fluid container in the visual manner just named is only possible when the fluid container is directly accessible.

If such a transparent rod is to be used for example to measure the level of cleaning and sealing agent for protecting the rollers against toner in an electrographic high-speed printer, then it is necessary to provide a device which, when the cleaning and sealing agent falls below a minimum level, reliably signals this level to the operator.

SUMMARY OF THE INVENTION

An object of the invention is to produce an indicating device for showing the level of fluids in fluid containers that makes it possible to indicate the level immediately when it falls below a specific value. In this connection the indicating device should not be sensitive to changes in the fluid level caused by the fluid slopping to and fro in the container.

This object is achieved in accordance with the invention in that a photoelectric device consisting of a light source and a light receiver is disposed at the opposite end of the rod to the sensing end. The device is connected to an electric circuit arrangement actuating a warning device when the reflection behavior of the sensing end of the rod changes.

Here the circuit arrangement consists of a setting arrangement determining the sensitivity of response, of a following amplification arrangement, and a hysteresis threshold-value switching arrangement.

It is possible to use the invention to advantage to immediately indicate the level externally when the fluid in a fluid container falls below a specific level. Tiny fluctuations in the level caused by the fluid slopping up and down around the minimum level cannot have any effect on the indicating device. The signal indicating the minimum level is only cancelled when the level of fluid lies clearly above the minimum valve as a result of topping up the fluid container.

BRIEF DESCRIPTION OF THE DRAWINGS

FIG. 1 shows a schematic view of the indicating device in a fluid container in accordance with the invention;

FIG. 2 shows a schematic view of the mounting of the light source and the light receiver on a transparent rod;

FIG. 3 shows a block circuit diagram of the arrangement in accordance with the invention; and FIG. 4 shows an embodiment of the circuit arrangement as in FIG. 2.

DESCRIPTION OF THE PREFERRED EMBODIMENT

In an electrographic high-speed printing arrangement not shown here, working by the intermediate carrier method with thermal fixing by means of rollers, the oil serving as cleaning and sealing agent to protect the rollers against the toner is stored in the storage container 1. This oil is used up, for which reason any drop below a minimum level must be signalled immediately by an indicating device as otherwise the printing quality of the printer deteriorates considerably. Here the indicating device itself consists of a rod 2 of transparent material, which may be plexiglass, for example, that projects into the fluid container 1 and ends at the point below which a warning signal is to be given. At its sensing end 3 projecting into the fluid the transparent rod 2 is provided with a 90° cone. The other end 4 is plane and carries a light source 5, which is a light-emitting diode in this case, and a light receiver 6, e.g. a phototransistor next to the light source 5.

A beam of light leaving the light source 5 is reflected at the conical end 3 when the end 3 of the transparent rod 2 is exposed to the air. If the end 3 of the rod is immersed in the fluid, no reflection takes place at the end 3 but the light beam 7 is diffused in the fluid. This physical property arising through the form of the rod 2 is utilized to generate a warning signal with the aid of a circuit arrangement as in FIG. 3 when the fluid in the fluid container falls below a specific minimum level.

Here the circuit arrangement in accordance with the invention consists of a light receiver 6, a following sensitivity regulator 8 with a linear amplifier 9 to which is connected a hysteresis threshold-value switch 10.

The detailed construction of the circuit is as shown in FIG. 4.

It consists of a light-emitting diode 5 which serves as light source and is fed from a voltage source 12 through a resistance 11.

The light receiver is constituted by a phototransistor 13 that is connected to the negative input of an integrated operational amplifier 14. The response threshold of the phototransistor 13 can be set with the aid of a potentiometer 16 limited through a resistance 15. The response potential of the operation amplifier 14 is determined through the resistances 17 and 18 constituting a voltage divider. A regenerative resistance 19 combines with the resistances 17 and 18 to define the hysteresis of the circuit arrangement which will be explained further in detail later on. A resistance 20 serves as a load resistance at the circuit output 21; its size depends upon the nature of the succeeding circuitry not shown here. A further resistance 22 feeds the operational amplifier 14; interference voltage peaks that may be superimposed over the signal of the phototransistor 13 are clipped with a capacitor 23.

The detailed function of the circuit arrangement in accordance with the invention is as follows. As long as light is not reflected in the cone 3 of the glass rod 2 because the glass rod is dipping in the fluid, the phototransistor 13 receives no light. It carries no current. This results in no voltage drop at the resistances 16, 15 and the negative input of the operations amplifier 14 has a positive potential. Consequently, its output 21 is negative and through the regenerative resistance 19 the positive input of the operations amplifier 14 is also maintained somewhat more negative than the state of the voltage division effected by the voltage divider 17 and 18.

As the level drops a point is reached at which the cone 3 begins to emerge from the fluid. As the emergence progresses, an increasingly large part of the area of the cone 3 becomes reflective. The phototransistor 13 receives more and more light and consequently carries more and more current, resulting in an increasingly large voltage drop at the resistances 16, 15. The potential at the negative input of the operations amplifier 14 becomes more negative and ultimately attains the value present at the positive input. The operations amplifier 14 begins to switch over. Its output 21 becomes more positive. At the same time the positive input also becomes somewhat more positive through the regenerative resistance 19. This backs up the action of the phototransistor 13 and allows the operations amplifier 14 to switch over very abruptly. A positive potential signifying "fluid below empty level" appears at the output 21.

The positive input of the operations amplifier 14 is now held at a somewhat more positive potential through the action of the regenerative feedback than the state of the voltage division effected by the resistances 17 and 18. A small resurgence in the fluid level, such as may be simulated by the fluid slopping to and fro in the container 1 or by other mechanical or electrical interference for instance, will not cause the signal signifying "fluid below empty level" to disappear. For it to disappear, it is necessary for the level of the fluid to rise instead by a certain amount, the value of which can be defined by the resistance ratio of the resistances 19, 17 and 18. In practice a setting has proved satisfactory in which the hysteresis, i.e. the difference between switch-on and switch-off potential at the output of the phototransistor, amounts to about 10% of the effective depth change.

Obviously it is not only possible to establish the empty level for a fluid container with the arrangement in accordance with the invention, for a plurality of such arrangements can also be used to monitor intermediate levels of fluid. In addition to fluids, powdered goods with corresponding optical properties can also be considered as media for level measurements. Depending on those goods, the tip 3 of the glass rod 2 can be suitably modified and have a spherical or parabolic shape, for example.

To attach the light source 5 and the light receiver 6 on the plane surface 4 of the glass rod 2, it is possible to mount both components on the glass rod 2 after the fashion of a plug by casting, as in the view in FIG. 2, or to anchor them with the aid of a plug-shaped mounting 23.

Although various minor modications may be suggested by those versed in the art, it should be understood that I wish to embody within the scope of the patent warranted hereon, all such embodiments as reasonably and properly come within the scope of my contribution to the art.

I claim as my invention:

1. An indicating device for showing the level of fluids in fluid containers, comprising: a single transparent rod terminating in a sensing end which is immersed in the fluid when the container is filled, the sensing end of which dipping in the fluid being formed such that a beam of light running in the transparent rod undergoes total reflection at the sensing end when the sensing end is not in contact with the fluid; at an end surface of the rod opposite the sensing end a photoelectric device is disposed comprising a light source and a light receiver both on the same end surface; the photoelectric device being connected with an electrical circuit means having switching means for actuating a warning device when a change occurs in the reflection behavior of the sensing end of the rod due to a fluid level change beyond a given level; and said circuit means comprising hysteresis means connected to the switching means for maintaining the switching means in a switched over condition despite a predetermined amount of occasional contact between the sensing end and the fluid due to slopping of the fluid but releasing the switched over condition when the fluid level changes by more than said predetermined amount at said given level.

2. An indicating device as in claim 1 in which said circuit means comprises a first voltage divider connected to a positive input of a differential amplifier, a resistance feeding back an output of the differential amplifier to the voltage divider, a second voltage divider connected to a negative input of the differential amplifier, and said photoelectric device being coupled to said negative input.

3. An indicating device as in claim 2, characterized in that the second voltage divider comprises an adjustable resistance and said light receiver.

4. An indicating device as in claim 1, characterized in that a light-emitting diode is provided as said light source and a phototransistor as said light receiver.

5. An indicating device for showing the level of a flowable substance in containers, comprising:
 (a) a transparent rod having a sensing end immersed in the flowable substance when the container is filled above a predetermined level, said sensing end having means for causing a substantially total reflection of a beam of light projected in the rod from an opposite end of the rod when the sensing end is not in contact with the flowable substance;
 (b) a light source and photoelectric detector arranged at the opposite end of the rod;
 (c) circuit means connected to the photoelectric detector including level setting means for determining a light level at which said circuit means will respond, switching amplifier means connected to said level setting means including hysteresis means for preventing response of said circuit means to a predetermined amount of slopping of the flowable substance to and fro in the container but allowing response when the level of the flowable substance changes by more than said predetermined amount at the given light level, and an output terminal of said circuit means for connection to an indicator.

6. The indicating device of claim 5 in which said hysteresis means includes a regenerative feedback branch connecting to an input of said switching amplifier means.

* * * * *